Sept. 29, 1970 J. A. McAVOY 3,531,659

PULSE GENERATOR PULSE-TIME CONTROL SYSTEM

Filed Aug. 11, 1967

INVENTOR.
JOHN A. MC AVOY.
BY
Russel C. Wells
ATTORNEY.

United States Patent Office 3,531,659

Patented Sept. 29, 1970

3,531,659
PULSE GENERATOR PULSE-TIME CONTROL SYSTEM

John A. McAvoy, Detroit, Mich., assignor to Burroughs Corporation, Detroit, Mich., a corporation of Michigan Filed Aug. 11, 1967, Ser. No. 659,971
Int. Cl. H03k *1/18*
U.S. Cl. 307—265 3 Claims

ABSTRACT OF THE DISCLOSURE

A monostable multivibrator having an external timing circuit coupled thereto for controlling the pulse output time in a predetermined relationship to the pulse repetition rate of the input pulse. The timing circuit comprises a transistor controlled extremely long RC network which is transistor-coupled to the timing circuit of the multivibrator. A one cycle response of the multivibrator to the variations in the interval between input pulses is the dominant feature of the disclosure.

BACKGROUND OF THE INVENTION

Field of invention

This invention relates to pulse generating devices in general and to variable output pulse width multivibrators in particular.

Prior art

In a data recording system, such as magnetic recording on tapes, discs, or magnetic records, the scanning speed of the transducer relative to the recording medium, determines the uniformity of the readback signal as to both amplitude and pulse repetition rate. The variations in the repetition rate are generally slow varying and are not always uniform.

Various devices have been developed to correct or to compensate for such repetition rate variations. This is especially true when the readback signal from the magnetic recording is supplied to a synchronous computing system which is clocked by an independent oscillator. One such device involves the manual switching of different timing voltages into the timing network of a pulse generator. In such a device, once the proper selection has been made, there is no automatic means for altering the timing to correspond to any new variations which may come about with a different tape, disc, or magnetic record.

Another prior art apparatus involves the use of various logic elements such as, AND gates, OR gates, inverters, etc., to provide an elaborate system for ignoring the effects on data transmission which small repetition rate variations may produce. This apparatus is costly in terms of both money and hardware space. Since the trend is to reduce the overall physical size of electronic equipment, such an approach, as above mentioned, is not consistent with such a design trend.

SUMMARY OF THE INVENTION

The invention herein is a pulse generating system having means for generating a series of pulses. This series of pulses is characterized as having variations in the time interval between each pulse. This time variation in the pulse repetition rate, is due to the manner in which the recording medium is controlled. The pulse generating system further comprises a second means for generating a series of pulses which tend to be uniform in pulse width but depend upon the presence of the first series of pulses for initiating the second means. A pulse timer, which is responsive to the variations in the first series of pulses, is connected to the second means for varying the pulse width according to the variation and thereby maintaining a predetermined ratio between pulse width and the variation.

DESCRIPTION OF THE DRAWINGS

The invention, both as to its organization and method of operation, together with further object and advantages thereof, will best be understood by reference to the following detailed description taken in connection with the accompanying drawings in which.

DETAILED DESCRIPTION

Figure 1:
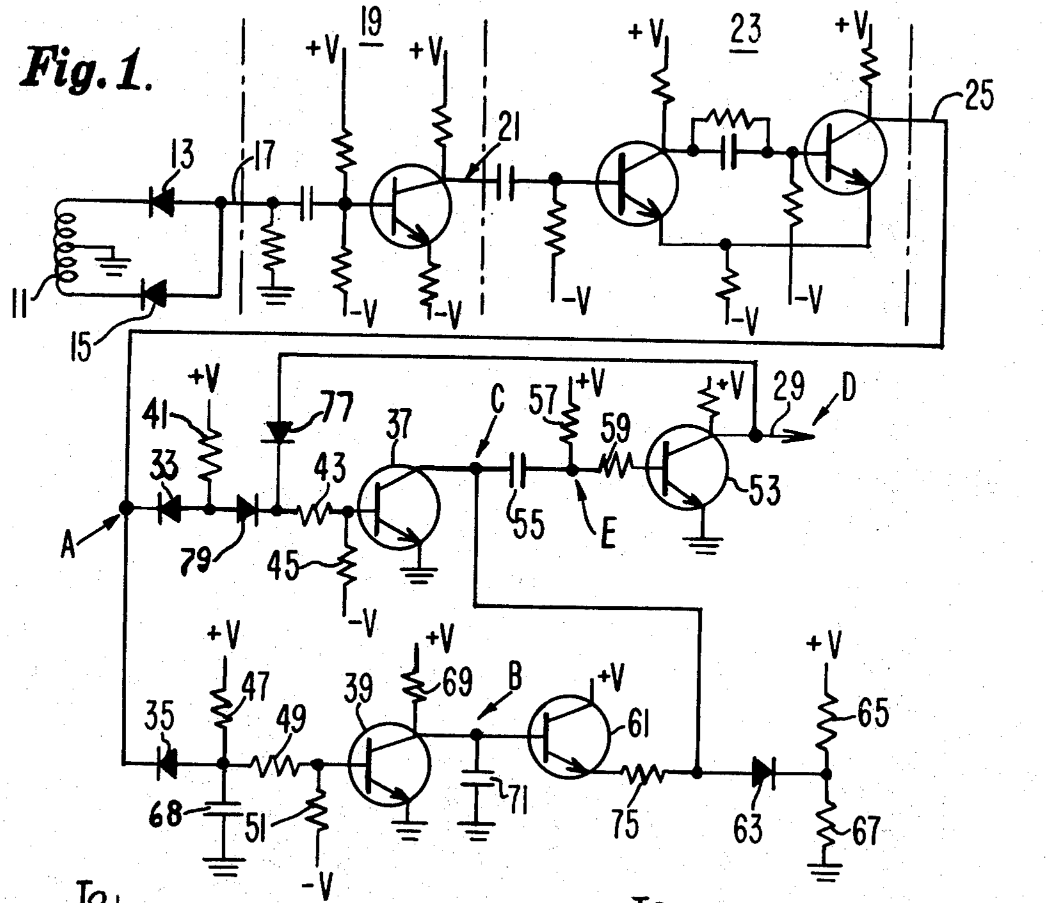
FIG. 1 is a schematic of a pulse generating system.

Referring to the figures and characters of reference, and in particular to FIG. 1, there is shown in detail the several sections comprising a pulse generating system including the preferred embodiment of the invention. The first section is a magnetic transducer for reading magnetically recorded information. The output of the transducer is then rectified, amplified, and shaped prior to being coupled to a pulse generator.

The transducer 11 is typical of any well-known transducer which is used to read magnetic tapes, discs, or other magnetic surfaces upon which information is recorded. For reasons of simplicity, the transducer shown is center-tapped thereby allowing the output of the transducer to be rectified and coupled to a single channel amplifier.

The rectifier section comprises a pair of like rectifiers or diodes 13 and 15 having their cathodes connected to the transducer 11 and their anodes connected together. The output 17 of the rectifiers 13 and 15 is then coupled to the amplifier section 19.

The amplifier section 19 is shown as a single stage amplifier. It is to be understood that such an amplifier must have sufficient capacity to adequately amplify the signals from the transducer 11 to a sufficient amplitude so as to function in the succeeding sections of the system. Such an amplifier is well known in the art. The output of the amplifier 21, which has the same waveform characteristic as developed by the transducer 11, is then shaped into square waves in a pulse shaping circuit 23. An example of such a circuit 23, which is also well known, is a Schmitt-trigger circuit. Section 23 represents in schematic form, a typical Schmitt-trigger circuit which may be used to achieve the desired wave shaping.

Figures 2A, 2B, 2C, 2D, 2E:
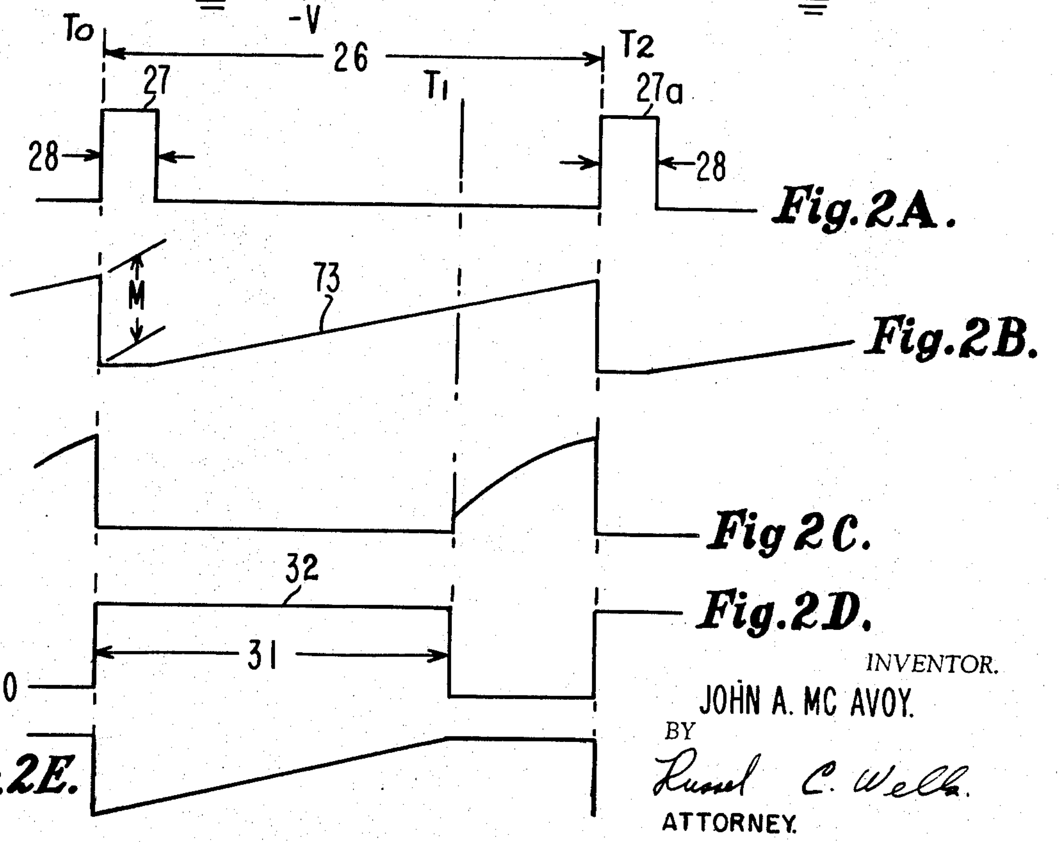
FIGS. 2A thru 2E are waveforms found at the various points in FIG. 1.

The output 25 of the Schmitt-trigger is a series of square-wave pulses 27 which are representative of the information recorded on the magnetic tape, disc, or similar surface. Such a surface, in the environment of the invention, is a magnetic oxide stripe on a record member, such as an accounting ledger. FIG. 2A shows the output waveform of section 23.

In FIGS. 2A through 2D, the abscissa of each waveform is in units of time, and the ordinate is in units of voltage. The units of time for each waveform are identical. It is to be understood that each waveform is repetitive.

In data systems utilizing such record members, it is customary for the record member to move relative to the transducer 11 and under the control of a drive which is in frictional contact with the record member. Such a drive is not shown. By the very nature of a frictional drive, the speed of the record member is not uniform but will vary to a degree. Such a variation, while not noticeable to the human eye, is nevertheless very noticeable to a magnetic transducer which is reading magnetic information of a pulse repetition rate of approximately 3000 hertz. Therefore, the output 25 of the pulse-shaper 23 is a series of square wave pulses 27 having a variation in the time 26 between pulses. The Schmitt-trigger is so designed that the pulse width 28 is approximately 3% of the total time 26 between pulses. A representation of such pulses 27 is shown in FIG. 2A.

The output 29 of the pulse generator is shown in FIG. 2D. It can be seen that the pulse width 31 or time of this pulse 32 is much greater than the pulse width 28 of the input pulse 27. It is the object of the invention to maintain a predetermined ratio between the pulse width 31 of the pulse 32 of FIG. 2D and the time 26 between the pulses of FIG. 2A. Such a ratio is represented as follows:

$$\text{Ratio}=\frac{T_1-T_0}{T_2-T_0}$$

with $T_0=0$ then $$\text{Ratio}=\frac{T_1}{T_2}$$

A typical value for such a ratio is 0.675.

The pulse generator comprises a monostable multivibrator having an external timer or timing control circuit. The output 25 of the pulse-shaper 23 is connected through a pair of parallel diodes 33 and 35 to the base circuit of the multivibrator input transistor 37 and to the base circuit of a timing transistor 39. The function of the two diodes 33 and 35 is to prevent any circuit action of either transistor 37 or 39 from affecting the circuit action of the other transistor. In each base circuit, there is a voltage divider network comprising three resistors 41, 43, 45 and 47, 49, 51 connected across a first (+V) and a second (−V) voltage potential. Each divider network biases their respective transistor 37 and 39 in a state of non-conduction.

In the multivibrator circuit, the input 37 and the output transistor 53 are always in the opposite state. That is, when the output transistor 53 is conducting, which is predominant, the input transistor 37 is off. When the output transistor 53 is conducting the output voltage at point D, FIG. 1, is at essentially ground potential.

The right-hand plate of the capacitor 55, as shown in FIG. 1, or the plate adjacent the base circuit of the output transistor 43, charges through the resistor 57 to the first potential +V as shown in FIG. 2E, but when the output transistor begins to conduct, the charging voltage is clamped to a voltage potential determined by the two resistors 57, 59 and the base emitter junction of the output transistor 53 all connected across the first potential +V. The opposite plate of the capacitor 55 charges to a voltage which is determined by the operation of the timing transistor 39 of the timer circuit. It is the magnitude of the voltage coupled across the multivibrator capacitor 55 which determines the pulse width 31 at point D.

In the steady state conditions in the timer circuit, the timing transistor 39 is off or non-conducting and the amplifier or coupling transistor 61 is on or conducting. The collector of the input transistor 37 has an upper limit voltage clamp to a positive voltage through a diode 63 to the junction of the voltage divider comprising a first voltage potential (+V), two resistors 65 and 67 and ground. This clamping action is to limit the maximum value of the voltage coupled across the multivibrator capacitor 55. Under normal operating conditions, this clamping action does not take place due to the pulse repetition rate of recorded data being sufficiently fast.

In the base circuit of the timing transistor 39 there is a capacitor 68 connected from the anode of the diode 35 to ground having the purpose of delaying the turning on of the timing transistor 39 for sufficient amount of time to allow the multivibrator circuit to lock on through the feedback diode 77. If the capacitor 68 was omitted, the desired timing action at point C would not be attained.

The action of the timing transistor 39 and its collector resistor 69 and shunt capacitor 71 provides the control necessary to maintain the desired ratio as previously mentioned. A positive pulse 27 applied to the base circuit of the timing transistor 39 causes that transistor 39 to be driven into conduction or turned on thereby rapidly discharging the shunt capacitor 71 through the collector-emitter circuit. This provides a very low impedance discharge path for the shunt capacitor 71. The timing transistor 39 remains in conduction for the period of time equal to the pulse width 28 of the pulse 27 from the shaper allowing the shunt capacitor 71 to become substantially discharged within the time of the pulse width 28. The collector resistor 69 and the capacitor 71 are selected to produce a long RC time constant which is much longer than the time between pulses from the shaper 25 or the desired output pulse width 31 at point D. This is to allow the time circuit to control the ultimate conduction of the output transistor 53 within the first time constant or linear portion 73 of the shunt capacitor's charging curve as shown in FIG. 2B.

The same pulse 27 is also applied through the trigger circuit to the base of the input transistor 37 of the monostable multivibrator driving that transistor into conduction. The lefthand plate of the capacitor 55 is discharged through the collector-emitter circuit of the input transistor 37 to ground. As is well known, this rapid discharge is reflected across the capacitor and is applied to the base of the output transistor 53 thereby driving that transistor out of conduction. The output voltage of the multivibrator goes positive as shown in FIG. 2D and is fed back to the base circuit of the input transistor 37 through the feedback diode 77. This feedback circuit including the collector resistor of the output transistor 53 provides sufficient base drive to maintain the input transistor 37 in conduction. The diode 79 acts as an "OR" diode to isolate the input pulse 27 and the feedback circuit.

Since the output transistor 53 is not in conduction, the righthand plate of the capacitor 55 starts to charge through resistor 57 to the relatively high fixed first potential as shown in FIG. 2E. When the charge voltage reaches a potential sufficient to drive the output transistor 53 into conduction at time $T_1$, the voltage on the right plate becomes clamped through the resistor 59 and the base-emitter circuit of the output transistor 53.

After the pulse 27 has passed, the timing transistor 39 turns off and the shunt capacitor 71 starts to charge to the first potential (+V) through the resistor 69. The base of the coupling transistor 61 follows this charge curve 73 but since the emitter resistor 75 is clamped to ground through the collector-emitter circuit of the input transistor 37 the lefthand plate of the capacitor 55 remains at ground.

When the output transistor 53 is turned on, the emitter resistor 75 of the coupling transistor 61 couples the potential of the charging voltage in its base circuit to the lefthand plate of the multivibrator capacitor 55 as shown in FIG. 2C. Point C, FIG. 1, will increase in voltage until the next pulse 27*a* is received from the shaper 23 which will turn on the timing transistor 39 and thereby discharging the shunt capacitor 71.

The lefthand plate charges to the voltage potential of the emitter of the coupling transistor 61 which is controlled by the voltage on the shunt capacitor 71.

When the next pulse 27 is received from the shaper 23, the magnitude M of the charge voltage on the lefthand plate of multivibrator capacitor 55 is then coupled to the righthand plate. The magnitude of the voltage coupled across the multivibrator capacitor 55 determines the output pulse width 31 by controlling the conduction of the input transistor 37. The greater the magnitude of this voltage, the more negative with respect to the first potential the righthand plate of the capacitor is driven at time $T_0$. The more negative the righthand plate becomes, the longer in time it takes the multivibrator capacitor 55 to charge to the level of base conduction voltage of the output transistor 53.

This magnitude of voltage is determined by the circuit action of timing transistor 39 which is responsive to the pulse width of the input pulses 27 from the shaper 23 and the magnitude of the charging voltage across the shunt capacitor 71, labelled "M" in FIG. 2B.

While a particular embodiment of the invention has been shown, it will be understood, of course, that it is not desired that the invention be limited thereto since modifications may be made, and it is, therefore, contemplated by the appended claims to cover any such modifications as fall within the true spirit and scope of the invention.

What is claimed is:

1. A pulse generator comprising:

a first means for generating a first series of pulses having a pulse time and a time between pulses, the time between pulses tending to vary, a second means for generating pulses electrically connected to receive pulses generated by said first means and operable to generate therefrom a second series of pulses having a pulse time and a time between pulses, the pulse time generated by said second means being different than the time between pulses generated by said first means, the pulse time generated by said second means tending to remain constant, a resistor-capacitor timing circuit having a time constant substantially longer than the time between pulses from said first means, said resistor-capacitor timing circuit generating a timing signal which is coupled to said second means for varying the pulse time of said second means, means for charging said resistor-capacitor timing circuit, and pulse timer means solely responsive to said first series of pulses and coupled to discharge said resistor-capacitor timing circuit for varying said timing signal and continuously maintaining a predetermined ratio between the pulse time generated by said second means and the variable time between pulses generated by said first means.

2. A pulse generator according to claim 1 wherein the ratio between the pulse time generated by said second means and the variable time between pulses generated by said first means, is less than one.

3. A pulse generator according to claim 1 wherein the pulse time of the pulse generated by the second means is larger than the pulse time generated by the first means.

References Cited

UNITED STATES PATENTS

| | | | |
|---|---|---|---|
| 2,708,239 | 5/1955 | Okrent | 328—58 |
| 3,204,124 | 8/1965 | Durio | 307—265 XR |
| 3,304,437 | 2/1967 | Dano | 307—265 XR |

DONALD D. FORRER, Primary Examiner

J. ZAZWORSKY, Assistant Examiner

U.S. Cl. XR.

307—233, 273, 293; 328—58